United States Patent
Farmer et al.

(10) Patent No.: US 6,490,860 B1
(45) Date of Patent: Dec. 10, 2002

(54) OPEN-LOOP METHOD AND SYSTEM FOR CONTROLLING THE STORAGE AND RELEASE CYCLES OF AN EMISSION CONTROL DEVICE

(75) Inventors: David George Farmer, Plymouth, MI (US); Gopichandra Surnilla, West Bloomfield, MI (US); Michael John Cullen, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/884,331

(22) Filed: Jun. 19, 2001

(51) Int. Cl.⁷ .................................................. F01N 3/00
(52) U.S. Cl. .............................. 60/285; 60/274; 60/295; 60/297; 60/276
(58) Field of Search ........................... 60/274, 285, 276, 60/295, 297, 286

(56) References Cited

U.S. PATENT DOCUMENTS

| | | |
|---|---|---|
| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |
| 4,167,924 A | 9/1979 | Carlson et al. |
| 4,178,883 A | 12/1979 | Herth |
| 4,186,296 A | 1/1980 | Crump, Jr. |
| 4,251,989 A | 2/1981 | Norimatsu et al. |
| 4,533,900 A | 8/1985 | Muhlberger et al. |
| 4,622,809 A | 11/1986 | Abthoff et al. |
| 4,677,955 A | 7/1987 | Takao |
| 4,854,123 A | 8/1989 | Inoue et al. |
| 4,884,066 A | 11/1989 | Miyata et al. |
| 4,913,122 A | 4/1990 | Uchida et al. |
| 4,964,272 A | 10/1990 | Kayanuma |
| 5,009,210 A | 4/1991 | Nakagawa et al. |

(List continued on next page.)

FOREIGN PATENT DOCUMENTS

| | | |
|---|---|---|
| DE | 196 07 151 C1 | 7/1997 |
| EP | 0 351 197 A2 | 1/1990 |
| EP | 0 444 783 A1 | 9/1991 |

(List continued on next page.)

OTHER PUBLICATIONS

C. D. De Boer et al., "Engineered Control Strategies for Improved Catalytic Control of $NO_x$ in Lean Burn Applications," SAE Technical Paper No. 881595, Oct. 10–13, 1988.

Y. Kaneko et al., "Effect of Air–Fuel Ratio Modulation on Conversion Efficiency of Three–Way Catalysts," SAE Technical Paper No. 780607, Jun. 5–9, 1978, pp. 119–127.

(List continued on next page.)

*Primary Examiner*—Thomas Denion
*Assistant Examiner*—Binh Tran
(74) *Attorney, Agent, or Firm*—Julia Voutyras; Allan J. Lippa

(57) ABSTRACT

A method and system for controlling the operation of an internal combustion engine, wherein exhaust gas generated by the engine is directed through an emission control device, includes determining instantaneous rates of storage for a constituent of the exhaust gas, such as $NO_x$, as well as the capacity reduction of the device to store the exhaust gas constituent as a function of a calculated value representing an amount of $SO_x$ which has accumulated in the device since a prior device-regeneration (desulfation) event. The calculated accumulated $SO_x$ value is also preferably used to schedule a device-regeneration event, as when the calculated accumulated $SO_x$ value exceeds a predetermined threshold value.

14 Claims, 1 Drawing Sheet

U.S. PATENT DOCUMENTS

| | | |
|---|---|---|
| 5,088,281 A | 2/1992 | Izutani et al. |
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,359,852 A | 11/1994 | Curran et al. |
| 5,377,484 A | 1/1995 | Shimizu |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,426,934 A | 6/1995 | Hunt et al. |
| 5,433,074 A | 7/1995 | Seto et al. |
| 5,437,153 A | 8/1995 | Takeshima et al. |
| 5,448,886 A | 9/1995 | Toyoda |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,531,972 A | 7/1996 | Rudy |
| 5,544,482 A | 8/1996 | Matsumoto et al. |
| 5,551,231 A | 9/1996 | Tanaka et al. |
| 5,554,269 A | 9/1996 | Joseph et al. |
| 5,569,848 A | 10/1996 | Sharp |
| 5,577,382 A | 11/1996 | Kihara et al. |
| 5,595,060 A | 1/1997 | Togai et al. |
| 5,598,703 A | 2/1997 | Hamburg et al. |
| 5,617,722 A | 4/1997 | Takaku |
| 5,622,047 A | 4/1997 | Yamashita et al. |
| 5,626,014 A | 5/1997 | Hepburn et al. |
| 5,626,117 A | 5/1997 | Wright et al. |
| 5,655,363 A | 8/1997 | Ito et al. |
| 5,657,625 A | 8/1997 | Koga et al. |
| 5,693,877 A | 12/1997 | Ohsuga et al. |
| 5,713,199 A | 2/1998 | Takeshima et al. |
| 5,715,679 A | 2/1998 | Asanuma et al. |
| 5,722,236 A | 3/1998 | Cullen et al. |
| 5,724,808 A | 3/1998 | Ito et al. |
| 5,729,971 A | 3/1998 | Matsuno et al. |
| 5,732,554 A | 3/1998 | Sasaki et al. |
| 5,735,119 A | 4/1998 | Asanuma et al. |
| 5,737,917 A | 4/1998 | Nagai |
| 5,740,669 A | 4/1998 | Kinugasa et al. |
| 5,743,084 A | 4/1998 | Hepburn |
| 5,743,086 A | 4/1998 | Nagai |
| 5,746,049 A | 5/1998 | Cullen et al. |
| 5,746,052 A | 5/1998 | Kinugasa et al. |
| 5,752,492 A | 5/1998 | Kato et al. |
| 5,771,685 A | 6/1998 | Hepburn |
| 5,771,686 A | 6/1998 | Pischinger et al. |
| 5,778,666 A | 7/1998 | Cullen et al. |
| 5,792,436 A | 8/1998 | Feeley et al. |
| 5,802,843 A | 9/1998 | Kurihara et al. |
| 5,803,048 A | 9/1998 | Yano et al. |
| 5,806,306 A | 9/1998 | Okamoto et al. |
| 5,813,387 A | 9/1998 | Minowa et al. |
| 5,831,267 A | 11/1998 | Jack et al. |
| 5,832,722 A | 11/1998 | Cullen et al. |
| 5,842,339 A | 12/1998 | Bush et al. |
| 5,842,340 A | 12/1998 | Bush et al. |
| 5,862,661 A | 1/1999 | Zhang et al. |
| 5,865,027 A | 2/1999 | Hanafusa et al. |
| 5,867,983 A | 2/1999 | Otani |
| 5,877,413 A | 3/1999 | Hamburg et al. |
| 5,910,096 A | 6/1999 | Hepburn et al. |
| 5,929,320 A | 7/1999 | Yoo |
| 5,934,072 A | 8/1999 | Hirota et al. |
| 5,938,715 A | 8/1999 | Zhang et al. |
| 5,953,907 A | 9/1999 | Kato et al. |
| 5,966,930 A | 10/1999 | Hatano et al. |
| 5,970,707 A | 10/1999 | Sawada et al. |
| 5,974,788 A | 11/1999 | Hepburn et al. |
| 5,974,791 A | 11/1999 | Hirota et al. |
| 5,974,793 A | 11/1999 | Kinugasa et al. |
| 5,974,794 A | 11/1999 | Gotoh et al. |
| 5,979,161 A | 11/1999 | Hanafusa et al. |
| 5,979,404 A | 11/1999 | Minowa et al. |
| 5,983,627 A | 11/1999 | Asik |
| 5,992,142 A | 11/1999 | Pott |
| 5,996,338 A | 12/1999 | Hirota |
| 6,003,308 A | 12/1999 | Tsutsumi et al. |
| 6,012,282 A | 1/2000 | Kato et al. |
| 6,012,428 A | 1/2000 | Yano et al. |
| 6,014,859 A | 1/2000 | Yoshizaki et al. |
| 6,023,929 A | 2/2000 | Ma |
| 6,026,640 A | 2/2000 | Kato et al. |
| 6,058,700 A | 5/2000 | Yamashita et al. |
| 6,073,440 A | 6/2000 | Douta et al. |
| 6,079,204 A | 6/2000 | Sun et al. |
| 6,092,021 A | 7/2000 | Ehlbeck et al. |
| 6,092,369 A | 7/2000 | Hosogai et al. |
| 6,101,809 A | 8/2000 | Ishuzuka et al. |
| 6,102,019 A | 8/2000 | Brooks |
| 6,105,365 A | 8/2000 | Deeba et al. |
| 6,119,449 A | 9/2000 | Köhler |
| 6,128,899 A | 10/2000 | Oono et al. |
| 6,134,883 A | 10/2000 | Kato et al. |
| 6,138,453 A | 10/2000 | Sawada et al. |
| 6,145,302 A | 11/2000 | Zhang et al. |
| 6,145,305 A | 11/2000 | Itou et al. |
| 6,148,611 A | 11/2000 | Sato |
| 6,148,612 A | 11/2000 | Yamashita et al. |
| 6,161,378 A | 12/2000 | Hanaoka et al. |
| 6,161,428 A | 12/2000 | Esteghlal et al. |
| 6,164,064 A | 12/2000 | Pott |
| 6,173,571 B1 * | 1/2001 | Kaneko et al. ............... 60/286 |
| 6,189,523 B1 | 2/2001 | Weisbrod et al. |
| 6,199,372 B1 * | 3/2001 | Wakamoto ................... 60/274 |
| 6,199,373 B1 | 3/2001 | Hepburn et al. |
| 6,202,406 B1 | 3/2001 | Griffin et al. |
| 6,205,773 B1 | 3/2001 | Suzuki |
| 6,214,207 B1 | 4/2001 | Miyata et al. |
| 6,216,448 B1 | 4/2001 | Schnaibel et al. |
| 6,216,451 B1 | 4/2001 | Schnaibel et al. |
| 6,233,923 B1 | 5/2001 | Itou et al. |
| 6,233,925 B1 * | 5/2001 | Hirota et al. ................. 60/285 |
| 6,237,330 B1 | 5/2001 | Takahashi et al. |
| 6,244,046 B1 | 6/2001 | Yamashita et al. |
| 6,276,130 B1 * | 8/2001 | Ito et al. ....................... 60/278 |

FOREIGN PATENT DOCUMENTS

| | | |
|---|---|---|
| EP | 0 503 882 A1 | 9/1992 |
| EP | 0 508 389 A1 | 1/1994 |
| JP | 62-97630 | 5/1987 |

| | | |
|---|---|---|
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-135147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

OTHER PUBLICATIONS

W. H. Holl, "Air–Fuel Control to Reduce Emissions I. Engine–Emissions Relationships," SAE Technical Paper No. 800051, Feb. 25–29, 1980.

A. H. Meitzler, "Application of Exhaust–Gas–Oxygen Sensors to the Study of Storage Effects in Automotive Three-–Way Catalysts," SAE Technical Paper No. 800019, Feb. 25–29, 1980.

J. Theis et al., "An Air/Fuel Algorithm to Improve the $NO_x$ Conversion of Copper–Based Catalysts," SAE Technical Paper No. 922251, Oct. 19–22, 1992.

W. Wang, "Air–Fuel Control to Reduce Emissions, II. Engine–Catalyst Characterization Under Cyclic Conditions," SAE Technical Paper No. 800052, Feb. 25–29, 1980.

T. Yamamoto et al., "Dynamic Behavior Analysis of Three Way Catalytic Reaction," JSAE 882072—882166.

* cited by examiner

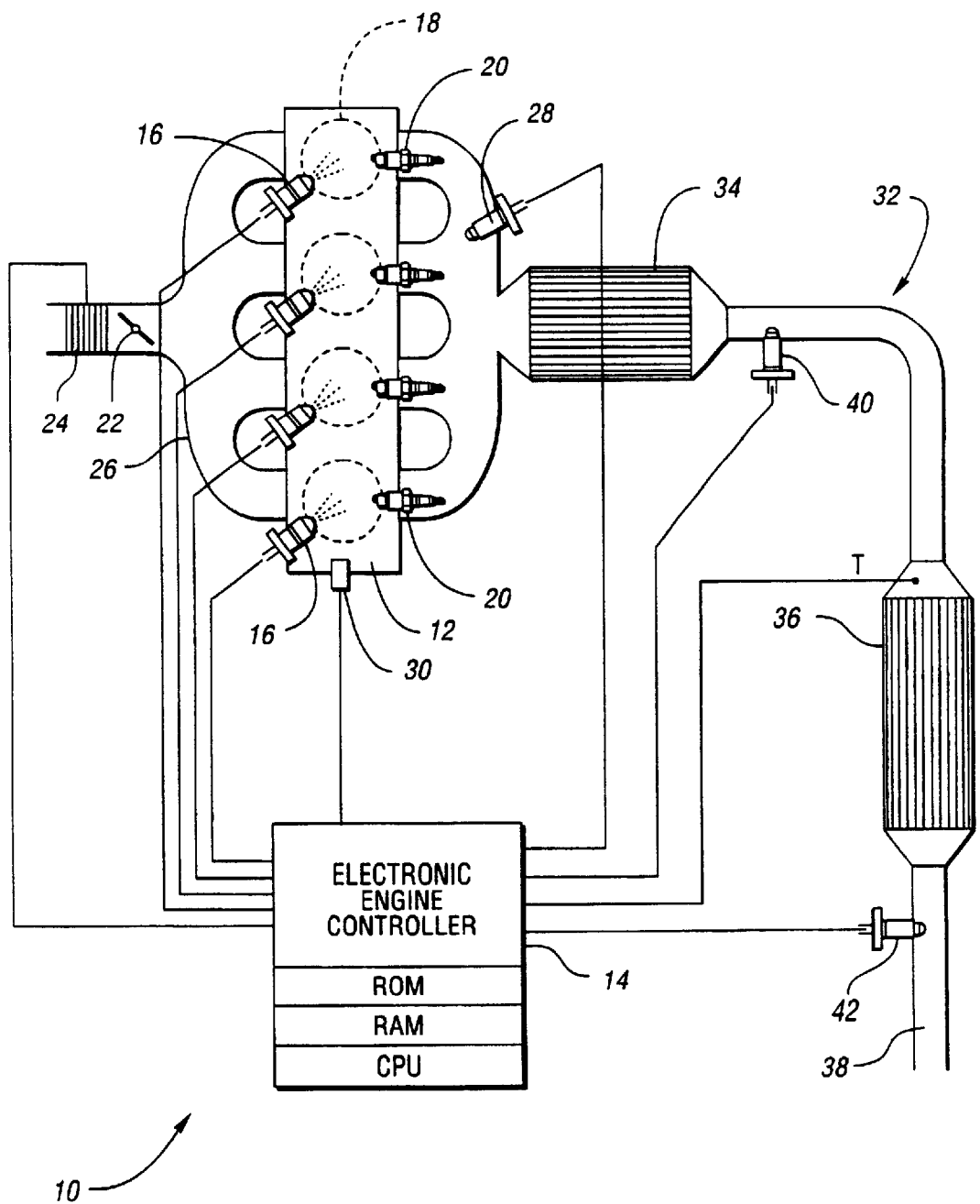

OPEN-LOOP METHOD AND SYSTEM FOR CONTROLLING THE STORAGE AND RELEASE CYCLES OF AN EMISSION CONTROL DEVICE

BACKGROUND OF THE INVENTION

1. Technical Field

The invention relates to methods and systems for controlling the nominal storage and release times used in connection with an emission control device to facilitate "lean-burn" operation of an internal combustion engine.

2. Background Art

Generally, the operation of a vehicle's internal combustion engine produces engine exhaust gas that includes a variety of constituents, including carbon monoxide (CO), hydrocarbons (HC), and nitrogen oxides ($NO_x$). The rates at which the engine generates these constituents are dependent upon a variety of factors, such as engine operating speed and load, engine temperature, spark timing, and EGR. Moreover, such engines often generate increased levels of one or more exhaust gas constituents, such as $NO_x$, when the engine is operated in a lean-burn cycle, i.e., when engine operation includes engine operating conditions characterized by a ratio of intake air to injected fuel that is greater than the stoichiometric air-fuel ratio (a "lean" engine operating condition), for example, to achieve greater vehicle fuel economy.

In order to control these vehicle tailpipe emissions, the prior art teaches vehicle exhaust treatment systems that employ one or more three-way catalysts, also referred to as emission control devices, in an exhaust passage to store and release select exhaust gas constituents, such as $NO_x$, depending upon engine operating conditions. For example, U.S. Pat. No. 5,437,153 teaches an emission control device which stores exhaust gas $NO_x$ when the exhaust gas is lean, and releases previously-stored $NO_x$ when the exhaust gas is either stoichiometric or "rich" of stoichiometric, i.e., when the ratio of intake air to injected fuel is at or below the stoichiometric air-fuel ratio. Such systems often employ open-loop control of device storage and release times (also respectively known as device "fill" and "purge" times) so as to maximize the benefits of increased fuel efficiency obtained through lean engine operation without concomitantly increasing tailpipe emissions as the device becomes "filled." The timing of each purge event must be controlled so that the device does not otherwise exceed its NO, storage capacity, because $NO_x$ would then pass through the device and effect an increase in tailpipe $NO_x$ emissions. The frequency of the purge is preferably controlled to avoid the purging of only partially filled devices, due to the fuel penalty associated with the purge event's enriched air-fuel mixture.

The prior art has recognized that the storage capacity of a given emission control device for a selected exhaust gas constituent is itself a function of many variables, including device temperature, device history, sulfation level, and the presence of any thermal damage to the device. Moreover, as the device approaches its maximum capacity, the prior art teaches that the incremental rate at which the device continues to store the selected exhaust gas constituent may begin to fall. Accordingly, U.S. Pat. No. 5,437,153 teaches use of a nominal $NO_x$-storage capacity for its disclosed device which is significantly less than the actual $NO_x$-storage capacity of the device, to thereby provide the device with a perfect instantaneous $NO_x$-retaining efficiency, that is, so that the device is able to store all engine-generated $NO_x$ as long as the cumulative stored $NO_x$ remains below this nominal capacity. A purge event is scheduled to rejuvenate the device whenever accumulated estimates of engine-generated $NO_x$ reach the device's nominal capacity.

The amount of the selected constituent gas that is actually stored in a given emission control device during vehicle operation depends on the concentration of the selected constituent gas in the engine feedgas, the exhaust flow rate, the ambient humidity, the device temperature, and other variables including the "poisoning" of the device with certain other constituents of the exhaust gas. For example, when an internal combustion engine is operated using a fuel containing sulfur, the prior art teaches that sulfur may be stored in the device and may correlatively cause a decrease in both the device's absolute capacity to store the selected exhaust gas constituent, and the device's instantaneous constituent-storing efficiency. When such device sulfation exceeds a critical level, the stored $SO_x$ must be "burned off" or released during a desulfation event, during which device temperatures are raised above perhaps about 650° C. in the presence of excess HC and CO. By way of example only, U.S. Pat. No. 5,746,049 teaches a device desulfation method which includes raising the device temperature to at least 650° C. by introducing a source of secondary air into the exhaust upstream of the device when operating the engine with an enriched air-fuel mixture and relying on the resulting exothermic reaction to raise the device temperature to the desired level to purge the device of $SO_x$.

Thus, it will be appreciated that both the device capacity to store the selected exhaust gas constituent, and the actual quantity of the selected constituent stored in the device, are complex functions of many variables that prior art accumulation-model-based systems do not take into account. The inventors herein have recognized a need for a method and system for controlling an internal combustion engine whose exhaust gas is received by an emission control device which can more accurately determine the amount of the selected exhaust gas constituent, such as $NO_x$, stored in an emission control device during lean engine operation and which, in response, can more closely regulate device fill and purge times to optimize tailpipe emissions.

SUMMARY OF THE INVENTION

Under the invention, a method is provided for controlling the fill and purge cycle of an emission control device disposed in an exhaust treatment system for an internal combustion engine. Under the invention, values representing an instantaneous rate at which a selected constituent of the engine-generated exhaust gas, such as $NO_x$, is stored in the device, and the instantaneous capacity of the device to store the selected constituent, are determined as a function of a calculated value representing an amount of $SO_x$ which has been accumulated in the device since an immediately prior desulfation event. More specifically, in a preferred embodiment, the calculated value representing the amount of accumulated $SO_x$ is determined as a function of the instantaneous fuel flow rate during lean and stoichiometric engine operating conditions, preferably further adjusted to reflect the effects of instantaneous air-fuel ratio and instantaneous device temperature on the accumulation of $SO_x$ in the device.

In accordance with another feature of the invention, in a preferred embodiment, the calculated value representing the amount of accumulated $SO_x$ is used to schedule a device-regeneration or "desulfation" event. Specifically, the value is preferably compared with a predetermined threshold value, with a desulfating engine operating condition being selected when the calculated accumulated $SO_x$ value exceeds the predetermined threshold value.

In accordance with another feature of the invention, the values representing the instantaneous storage rate for the selected constituent in the device, and the instantaneous storage capacity, are further determined as a function of a determined value representing a permanent reduction in the constituent storage capacity of the device due to thermal effects and "penetrated" or diffused sulfur which cannot otherwise be purged during a nominal device-desulfation event.

The above object and other objects, features, and advantages of the present invention are readily apparent from the following detailed description of the best mode for carrying out the invention when taken in connection with the accompanying drawings.

BRIEF DESCRIPTION OF THE DRAWING

The Drawing is a schematic of an exemplary system for practicing the invention.

DETAILED DESCRIPTION OF THE PREFERRED EMBODIMENT(S)

Referring to the Drawing, an exemplary control system 10 for a four-cylinder gasoline-powered engine 12 for a motor vehicle includes an electronic engine controller 14 having ROM, RAM and a processor ("CPU") as indicated, as well as an engine-off timer that provides a value for the elapsed time since the engine 12 was last turned off as a variable, "soak time." The controller 14 controls the operation of each of a set of fuel injectors 16. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or about the stoichiometric air-fuel ratio ($\lambda$=1.00). A plurality of other sensors, including an engine speed sensor and an engine load sensor, indicated generally at 30, also generate additional signals in a known manner for use by the controller 14.

An exhaust system 32 transports exhaust gas produced from combustion of an air-fuel mixture in each cylinder 18 through a pair of emission control devices 34,36. A second oxygen sensor 40, which may also be a switching-type HEGO sensor, is positioned in the exhaust system 32 between the first and second devices 34,36. A third oxygen sensor 42, which likewise is a switching-type HEGO sensor, is positioned downstream of the second device 36. In accordance with another feature of the invention, a temperature sensor generates a signal representing the instantaneous temperature T of the second device 36, also useful in optimizing device performance as described more fully below.

Upon commencing lean engine operation, the controller 14 adjusts the output of the fuel injectors 16 to thereby achieve a lean air-fuel mixture for combustion within each cylinder 18 having an air-fuel ratio greater than about 1.3 times the stoichiometric air-fuel ratio. In accordance with the invention, for each subsequent background loop of the controller 14 during lean engine operation, the controller 14 determines a value representing the instantaneous rate FG_NOX_RATE at which $NO_x$ is being generated by the engine 12 as a function of instantaneous engine operating conditions, which may include, without limitation, engine speed, engine load, air-fuel ratio, EGR, and spark.

By way of example only, in a preferred embodiment, the controller 14 retrieves a stored estimate FG_NOX_RATE for the instantaneous $NO_x$-generation rate from a lookup table stored in ROM based upon sensed values for engine speed N and engine load LOAD, wherein the stored estimates FG_NOX_RATE are originally obtained from engine mapping data.

During a first engine operating condition, characterized by combustion in the engine 12 of a lean air-fuel mixture, the controller 14 determines a value FG_NOX_RATE representing the instantaneous rate, in grams-per-hour, at which $NO_x$ is being generated by the engine 12, preferably expressed by the following relationship:

FG_NOX_RATE=FNXXX1(N, LOAD)*FNXXA($\lambda$)*FNXXB(EGRACT)*FNXXC(SPK_DELTA)*FMXXD(ECT-200)

where:
FNXXX1(N,LOAD) is a lookup table containing $NO_x$ emission rate values, in grams-per-hour, for current engine speed N and engine load LOAD;
FNXXA($\lambda$) is a lookup table for adjusting the FG_NOX_RATE value for air-fuel ratio which inherently adjusts the FG_NOX_RATE value for barometric pressure;
FNXXB(EGRACT) is a lookup table for adjusting the FG_NOX_RATE value for actual exhaust gas recirculation percentage;
FNXXC(SPK_DELTA) is a lookup table for adjusting the FG_NOX_RATE value for the effect of knock sensor or hot open-loop induced spark retard, with $NO_x$ production being reduced with greater spark retard; and
FMXXD(ECT-200) is a lookup table for adjusting the FG_NOX_RATE value for the effect of engine coolant temperature above 200° F.

Preferably, the determined feedgas $NO_x$ rate FG_NOX_RATE is further modified to reflect any reduction in feedgas $NO_x$ concentration upon passage of the exhaust gas through the first device 34, as through use of a ROM-based lookup table of three-way catalyst efficiency in reducing $NO_x$ as a function of the current air-fuel ratio $\lambda$, to obtain an adjusted instantaneous feedgas $NO_x$ rate ADJ_FG_NOX_RATE.

The controller 14 also calculates an instantaneous value INCREMENTAL_NOX_RATE representing the incremental rate at which $NO_x$ is stored in the second device 36 during each background loop (e.g., $t_{i,j}$) executed by the controller 14 during a given lean operating condition, in accordance with the following formula:

INCREMENTAL_NOX_RATE=ADJ_FG_NOX_
   RATE*FNNXRT_EFF(T,TOTAL_NOX)*FNSX_EFF(SOX_
   GRAMS), where:

FNNXRT_EFF(T,TOTAL_NOX) represents a lookup table for instantaneous device efficiency based on instantaneous device temperature T and a current value representing a cumulative amount TOTAL_NOX of $NO_x$ which has previously been stored in the second device 36 during a given lean engine operating condition, as described more fully below; and FNSX_EFF(SOX_GRAMS) represents an empirically established capacity modifier which varies as a function of a current value SOX_GRAMS representing an amount of $SO_x$ which has accumulated within the second device 36 since a prior desulfating event, the value SOX_GRAMS being itself determined based on fuel flow, as described more fully below.

The controller 14 thereafter updates a stored value TOTAL_NOX representing the cumulative amount of $NO_x$ which has been stored in the second device 36 during the given lean operating condition, in accordance with the following formula:

TOTAL_NOX←TOTAL_NOX+INCREMENTAL_NOX_
   RATE*$t_{i,j}$.

The controller 14 then determines a suitable value NOX_CAP representing the instantaneous $NO_x$-storage capacity of the second device 36. By way of example only, in a preferred embodiment, the value NOX_CAP varies as a function of second device temperature T, a determined value FNSX_CAP representing the amount of accumulated $SO_x$, and a determined value PERMANENT_AGING representing an adjustment of $NO_x$ storing capacity due to thermal aging and penetrated sulfur (which cannot otherwise be purged from the second device 36 during a desulfation event). More specifically, in a preferred embodiment, the instantaneous $NO_x$-storage capacity value NOX_CAP is calculated in accordance with the following formula:

NOX_CAP=NOX_PURGE*FNNX_CAP(T)*FNSX_CAP-
   (SOX_GRAMS)*PERMANENT_AGING where:

NOX_PURGE is a predetermined threshold value for second device $NO_x$-storage capacity;

FNNX_CAP(T) represents an empirically established capacity modifier which varies as a function of second device temperature T;

FNSX_EFF(SOX_GRAMS) represents an empirically established capacity modifier which varies as a function of the current value SOX_GRAMS representing an amount of $SO_x$ which has accumulated within the second device 36 since a prior desulfating event; and PERMANENT_AGING represents an empirically established capacity modifier which varies as a function of thermal aging and permanent sulfation of the second device 36.

The controller 14 then compares the updated value TOTAL_NOX representing the cumulative amount of $NO_x$ stored in the second device 36 with the determined value NOX_CAP representing the second device's instantaneous $NO_x$-storage capacity. The controller 14 discontinues the given lean operating condition and schedules a purge event when the updated value TOTAL_NOX exceeds the determined value NOX_CAP.

As noted above, the controller 14 determines values for FNSX_EFF and FNSX_CAP based upon the current value SOX_GRAMS representing the amount of $SO_x$ which has accumulated in the second device 36 since the last desulfation event, during both lean and stoichiometric engine operating conditions. In accordance with another feature of the invention, the controller 14 determines the current value SOX_GRAMS by determining a value DELTA_SOX representing an instantaneous amount of $SO_x$ which is being added to the second device 36 during a given background loop time $t_{i,j}$, using the following formula:

DELTA_SOX=FNSOXFUEL(FUELFLOW_MFA
   AM,λ,$t_{i,j}$)*FNSOXADJ(λ,T)*$t_{i,j}$, where:

FUELFLOW_MFA represents a calculated value for current fuel flow rate based on current air mass flow AM, the current air-fuel ratio λ, and the background loop time $t_{i,j}$;

FNSOXFUEL(FUELFLOW_MFA) represents an empirically established generated-$SO_x$ modifier which varies as a function of the current fuel flow rate FUELFLOW_MFA; and FNSOXADJ(λ,T) represents an empirically established generated-$SO_x$ modifier which varies as a function of both the current air-fuel ratio λ and the instantaneous second device temperature T.

The controller 14 thereafter updates a stored value SOX_GRAMS representing the cumulative amount of $SO_x$ which has accumulated in the second device 36 since the last desulfation event, in accordance with the following formula:

SOX_GRAMS←SOX_GRAMS+DELTA_SOX.

In accordance with a further benefit of the invention, the current value SOX_GRAMS is also used to schedule a desulfation event. Specifically, the controller 14 compares the current value SOX_GRAMS to a predetermined threshold value SOX_MAX_GRAMS. The controller 14 schedules a desulfation event when the current value SOX_GRAMS exceeds the predetermined threshold value SOX_MAX_GRAMS.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. In a method for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is directed through an emission control device that stores a selected exhaust gas constituent when the exhaust gas is lean and releases the stored selected constituent when the exhaust gas is rich, the method comprising:

determining a first value representing an amount of $SO_x$ accumulated in the device;

determining a second value representing an amount of the selected constituent currently stored in the device as a function of the first value; and selecting an engine operating condition as a function of the second value, wherein determining the first value includes accumulating an instantaneous value representative of an incremental amount of accumulated $SO_x$ during an engine operating condition characterized by an air-fuel mixture that is not richer than a stoichiometric air-fuel mixture.

2. The method of claim 1, wherein the instantaneous value is adjusted based on at least one of an instantaneous air-fuel ratio and an instantaneous device temperature.

3. The method of claim 1, including resetting the first value to zero when selecting the desulfating engine operating condition.

4. In a method for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is directed through an emission control device that stores a selected exhaust gas constituent when the exhaust gas is lean and releases the stored selected constituent when the exhaust gas is rich, the method comprising:

determining a first value representing an amount of $SO_x$ accumulated in the device;

determining a second value representing an amount of the selected constituent currently stored in the device as a function of the first value; and selecting an engine operating condition as a function of the second value, wherein the first value is determined as a function of the instantaneous fuel flow rate during engine operating conditions no richer than a stoichiometric engine operating condition.

5. In a method for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is directed through an emission control device that stores a selected exhaust gas constituent when the exhaust gas is lean and releases the stored selected constituent when the exhaust gas is rich, the method comprising:

determining a first value representing an amount of $SO_x$ accumulated in the device;

determining a second value representing an amount of the selected constituent currently stored in the device as a function of the first value; and selecting an engine operating condition as a function of the second value, further including determining a third value representing a current capacity of the device to store the selected constituent as a function of the first value; and wherein selecting includes comparing the second value to the third value.

6. In a method for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is directed through an emission control device that stores a selected exhaust gas constituent when the exhaust gas is lean and releases the stored selected constituent when the exhaust gas is rich, the method comprising:

determining a first value representing an amount of $SO_x$ accumulated in the device;

determining a second value representing an amount of the selected constituent currently stored in the device as a function of the first value; and selecting an engine operating condition as a function of the second value, wherein selecting further includes comparing the first value with a predetermined threshold value.

7. The method of claim 6, wherein the desulfating engine operating condition is selected when the first value exceeds the predetermined threshold value.

8. A system for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is received by an emission control device that stores a selected exhaust gas constituent when the exhaust gas is lean and releases the stored selected constituent when the exhaust gas is rich, the system comprising:

a controller including a microprocessor arranged to determine a first value representing an amount of $SO_x$ accumulated in the device, and to determine a second value representing an amount of the selected constituent currently stored in the device as a function of the first value, the controller being further arranged to select an engine operating condition as a function of the second value, wherein the controller is further arranged to accumulate an instantaneous value representative of an incremental amount of accumulated $SO_x$ during an engine operating condition characterized by an air-fuel mixture that is not richer than a stoichiometric air-fuel mixture.

9. The system of claim 8, wherein the controller is further arranged to adjust the instantaneous value based on at least one of an instantaneous air-fuel ratio and an instantaneous device temperature.

10. The system of claim 8, wherein the controller is further arranged to reset the first value to zero when selecting the desulfating engine operating condition.

11. A system for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is received by an emission control device that stores a selected exhaust gas constituent when the exhaust gas is lean and releases the stored selected constituent when the exhaust gas is rich, the system comprising:

a controller including a microprocessor arranged to determine a first value representing an amount of $SO_x$ accumulated in the device, and to determine a second value representing an amount of the selected constituent currently stored in the device as a function of the first value, the controller being further arranged to select an engine operating condition as a function of the second value, wherein the controller is further arranged to determine the first value as a function of the instantaneous fuel flow rate during engine operating conditions no richer than a stoichiometric engine operating condition.

12. A system for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is received by an emission control device that stores a selected exhaust gas constituent when the exhaust gas is lean and releases the stored selected constituent when the exhaust gas is rich, the system comprising:

a controller including a microprocessor arranged to determine a first value representing an amount of $SO_x$ accumulated in the device, and to determine a second value representing an amount of the selected constituent currently stored in the device as a function of the first value, the controller being further arranged to select an engine operating condition as a function of the second value, wherein the controller is further arranged to determine a third value representing a current capacity of the device to store the selected constituent as a function of the first value, and wherein the controller is further arranged to compare the second value to the third value.

13. A system for controlling an engine, wherein the engine is operative at a plurality of engine operating conditions, including a desulfating engine operating condition, characterized by combustion of air-fuel mixtures lean and rich of a stoichiometric air-fuel mixture, and wherein exhaust gas generated by such combustion is received by an emission control device that stores a selected exhaust gas constituent when the exhaust gas is lean and releases the stored selected constituent when the exhaust gas is rich, the system comprising:

a controller including a microprocessor arranged to determine a first value representing an amount of $SO_x$ accumulated in the device, and to determine a second value representing an amount of the selected constituent currently stored in the device as a function of the first value, the controller being further arranged to select an engine operating condition as a function of the second value, wherein the controller is further arranged to compare the first value with a predetermined threshold value.

14. The system of claim 13, wherein the controller is further arranged to select the desulfating engine operating condition when the first value exceeds the predetermined threshold value.

* * * * *